Oct. 26, 1965         A. A. ROOD         3,214,181
SEALING ARRANGEMENT
Filed Dec. 13, 1962         2 Sheets-Sheet 1

INVENTOR.
Alvin A. Rood
BY
Paul J. Reising
ATTORNEY

United States Patent Office 3,214,181
Patented Oct. 26, 1965

3,214,181
SEALING ARRANGEMENT
Alvin A. Rood, Willoughby, Ohio, assignor to General Motors Corporation, Detroit, Mich., a corporation of Delaware
Filed Dec. 13, 1962, Ser. No. 244,476
9 Claims. (Cl. 277—170)

This invention concerns a sealing arrangement for sealing the joint between two connectible members located in a high pressure fluid system.

The present trend in hydraulic systems for earth-moving equipment, such as scrapers, front end loaders and dozers, is to higher operating pressures in order to get more work done in less space. As should be apparent, when the hydraulic pressures increase, the power also increases permitting the use of a smaller amount of fluid flow which, in turn, allows the use of fluid circuits that require less area. This, of course, is an important factor so far as earth-moving vehicles are concerned inasmuch as frequently very little space is available for the various components of the hydraulic system. The chief drawback, however, in the use of high pressure systems is that the various fittings and joints in the hydraulic lines are subjected to such high forces that they tend to separate causing failure of the seals with resultant leaks. This problem is particularly acute in the case of the filter assemblies employed in these systems. Typically, the cover of the filter assembly has a substantial area exposed to the high operating pressure and, accordingly, is subjected to forces of a magnitude which cause cover deflection with consequent seal extrusion and leaks.

This invention contemplates a sealing arrangement which alleviates the above-mentioned problem by providing a pair of members, one of which is threadably or otherwise connected with the other. A seal-retaining groove is formed in one of the members and includes a laterally extending surface which engages an inclined surface on the other member at a point substantially intermediate the ends of the former. A resilient sealing member is disposed in the groove and compressed by the laterally extending surface so as to substantially fill the groove and sealingly engage the inclined surface.

Figure 1:
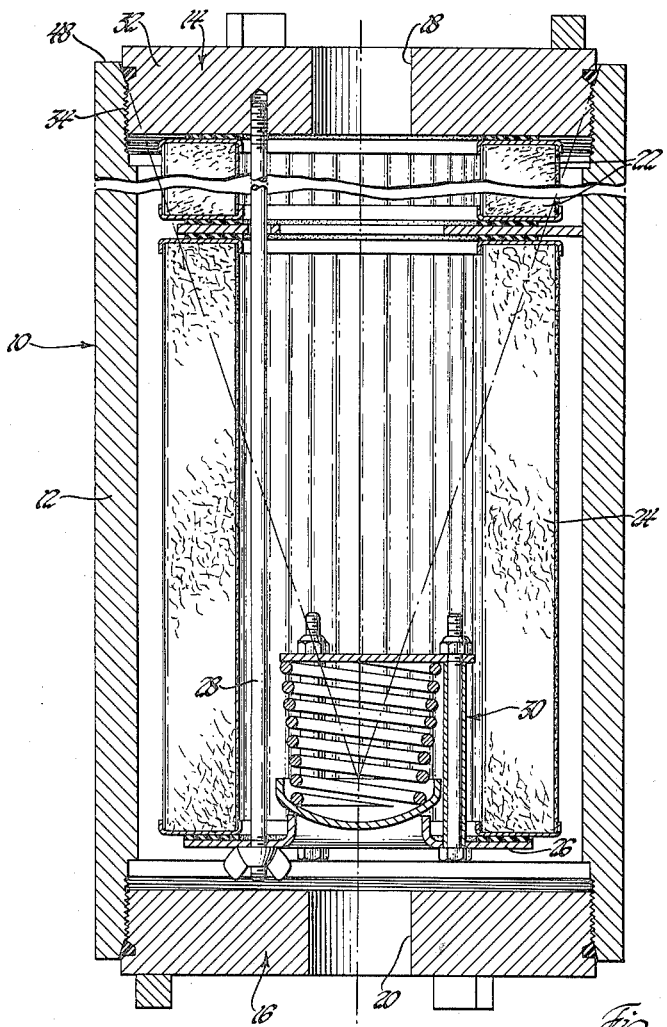
Figure 2:
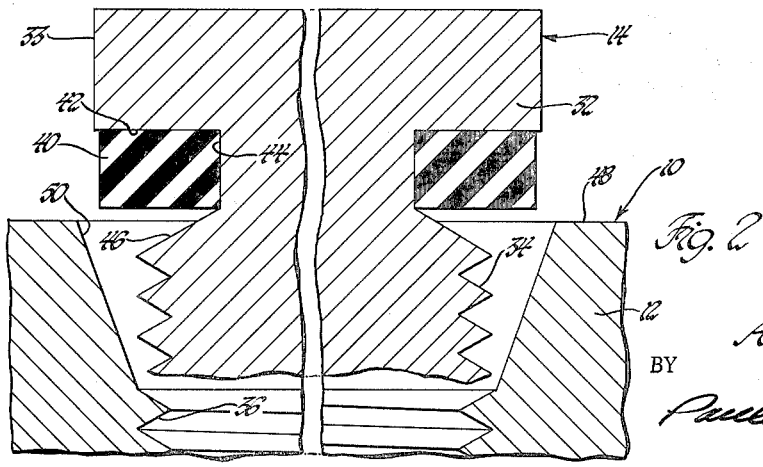
Figure 3:
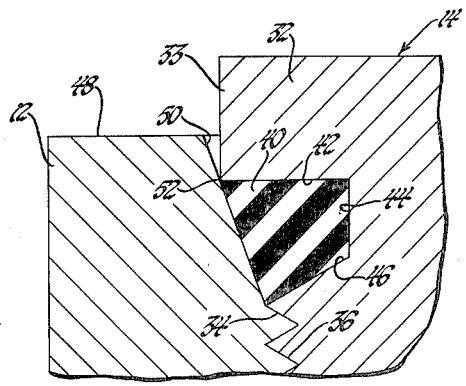
Figure 5:
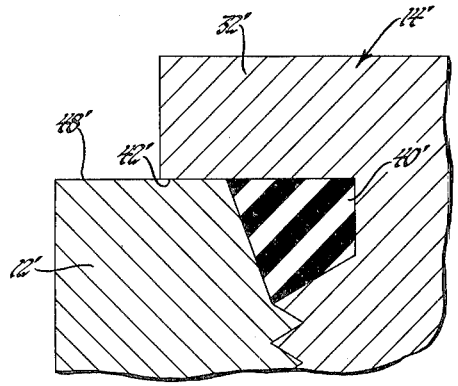
Figure 4:
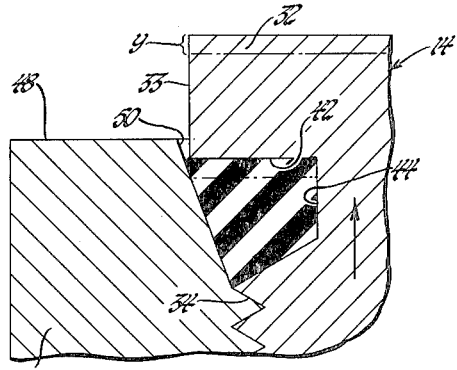
Figure 6:
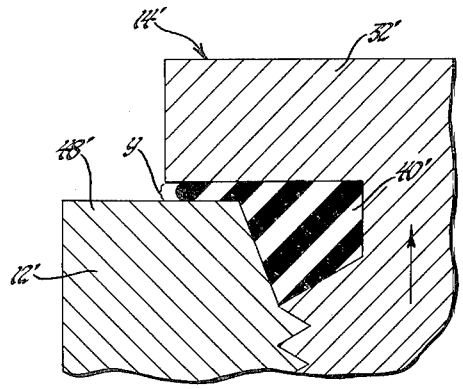
Figure 7:
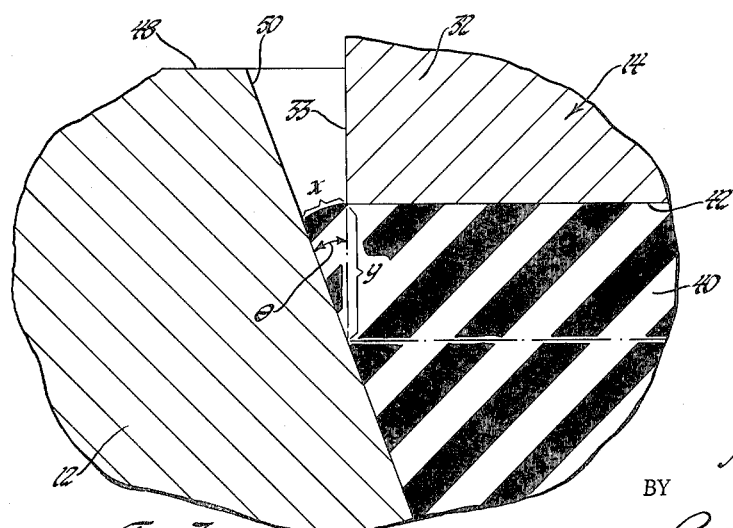

A more complete understanding of the invention will be derived from the following detailed description which has reference to the accompanying drawings in which:

FIGURE 1 is a sectioned elevation view of a filter assembly incorporating a sealing arrangement made in accordance with the invention, FIGURE 2 is an enlarged fragmentary view of the upper cover of the filter assembly of FIG. 1 and disconnected from the housing, FIGURE 3 is an enlarged fragmentary view of the sealing arrangement shown in FIG. 1 with the cover threaded into the filter assembly housing, FIGURE 4 is similar to FIG. 3 but shows the relative positions of the cover and housing when the former is displaced vertically from the latter, FIGURE 5 is a view similar to FIG. 3 and illustrates the sealing arrangement used in prior constructions, FIGURE 6 is a view similar to FIG. 4 using the prior construction of FIG. 5 as an example, and FIGURE 7 is an enlarged view of a portion of FIGURE 4.

Referring now to FIG. 1, a filter assembly 10 of a type used in a high pressure hydraulic system is shown comprising a tubular housing 12 closed at the opposite ends thereof by disc-type covers 14 and 16 wihch are respectively formed with oil outlet and inlet ports 18 and 20. A pair of axially aligned cylindrical filter elements 22 and 24 are concentrically located in the housing and held in the position shown by a clamping assembly which includes an apertured support element 26 fixed to the cover 14 by a plurality of elongated fasteners, one of which is indicated by the numeral 28. In this instance, each of the filter elements comprises a continuous sheet joined at opposite ends and formed with a plurality of longitudinal pleats so as to increase the effective cleaning surface of the elements.

A valve assembly 30 is fixed to the support element 26 and serves as a by-pass valve permitting oil flow directly through the center of the filter assembly when the filter element is so contaminated that oil cannot readily pass therethrough. Thus, it should be apparent that when the filter elements are not clogged, the oil flow is through the inlet port 20 wherefrom it flows radially outwardly to the annular space between the inner wall of the housing and the filter elements. The oil then passes radially inwardly through the filter elements and finally exits as a cleaned oil via outlet port 18.

At this juncture, it should be noted that both the upper and lower covers are identical in structure, and for this reason reference will now be made to the sealed joint or sealing arrangement formed by the upper cover 14 with the housing 12, it being understood that parts corresponding to those to be described in this regard are also incorporated with the lower cover 16 and the adjacent housing.

FIG. 2 fragmentarily shows the cover 14 disassembled from the housing and inculding a cap portion 32 terminating with a peripheral surface 33 and a threaded portion 34 that is adapted to mate with corresponding threads 36 formed on the inner counterbored wall of the housing 12. Moreover, the cover 14 is provided with an annular seal-retaining groove that is located between the cap and threaded portion of the cover and adapted to accommodate a ring-type rubber sealing member 40 that is rectangular in cross section. The groove is defined by a laterally extending upper surface 42, a substantially vertical base wall 44 and a tapering lower wall 46 that connects with the threaded portion of the cover. The housing 12 terminates with a flat surface 48 that leads to an inclined wall or surface 50 which serves as a seat for the cap portion 32 and lies in a cone having its apex located on the longitudinal center axis of the housing as seen in FIG. 1. Thus, and with reference to FIG. 3, when the cover is threaded into the housing, the sealing member 40 is compressed into sealing engagement with surface 50 while the cap edge, at the intersection of the cap surface 33 and groove surface 42, engages the inclined surface 50 at a point 52 located substantially intermediate the ends of this surface.

As alluded to above, it is intended that the filter assembly of FIG. 1 be used in a hydraulic system which operates at extremely high fluid pressures. Accordingly, it should be apparent that inasmuch as a substantial inner area of the cover is exposed to these high pressures, the cover is subjected to a large effective force acting, as in the case with cover 14, in an upward direction and tending to raise the cap portion 32 from its seat on the housing. In prior constructions, as shown in FIGS. 5 and 6, lower surface 42' of the cap portion 32' is seated directly on the flat terminating upper surface 48' of the housing 12' with a sealing member 40' provided in a groove similar in configuration to that of the present invention. As a result of this type of sealing arrangement, when the cover 14' is raised from the housing due to the high operating pressures in the hydraulic system, the surface 42' is displaced a predetermined vertical distance y resulting in a gap equal to the vertical displacement of the cover permitting a portion of the sealing member to be extruded, as seen in FIG. 6. A subsequent drop in operating pressure, of course, causes the cap portion to return to its position of FIG. 5 and pinch the extruding portion of the seal. This extruding effect occurring repeatedly as the operating pressures rise and fall results in early failure of the seal and leaking of hydraulic fluid.

With the above in mind and with reference to the present invention, as seen in FIGS. 4 and 7, it should be noted that when the cover 14 is raised from the dotted line position to the full line position a vertical distance $y$, the gap opened by this displacement rather than being equal to $y$, as is the case in the prior construction described above, is now substantially less and equal to the distance $x$. Hence, the gap through which the sealing member can extrude is reduced to the point where the extrusion effect is substantially minimized. This is accomplished in accordance with the invention by having the outer diameter of the cap portion reduced and providing a metal-to-metal contact between the cap portion and an inclined surface such as surface 50 formed on the housing. Thus the extruding gap is equal to a length $x$ which is a perpendicular line extending from the inclined surface to the lower corner of the cap portion. It should be understood, however that the gap as indicated by the letter $x$ is a function of an angle theta $(\theta)$, which is located between the surfaces 33 and 50, and the displacement $y$. Hence, by decreasing the angle theta, the gap $x$ will be decreased while an increase in this angle brings about a larger gap. Even in the latter case, however, the gap is less than the distance $y$ and, therefore, extrusion is minimized. It has been found that for optimum sealing the angle theta is preferably in the range between 10° and 30° which provides the smallest gap $x$ for a given displacement $y$ and still gives an effective metal-to-metal line contact between the lower corner of the cap portion and the inclined surface on the housing. Moreover, it has been found that the sealing member 40 can have a square cross section or take the form of an O ring. In each instance, the outer diameter of the sealing member should not be greater and preferably slightly less than the outer diameter of the cap portion of the cover.

Various changes and modifications can be made in the above-described construction without departing from the spirit of the invention. It should be understood that such changes are contemplated and the inventor does not wish to be limited except by the scope of the appended claims.

What is claimed is:

1. A sealing arrangement comprising: a first member having a groove formed therein, said groove having a lateral wall terminating with a pointed edge, a second member mating with said first member and having an inclined surface adjacent said groove, a resilient seal member disposed in said groove and being compressed by said lateral wall to substantially fill said groove and to sealingly engage said inclined surface, said pointed edge of said wall being the only portion of the first member engaging said inclined surface between the ends thereof in the normal relation of said members so as to provide a line contact therebetween, and said wall being disposed closely adjacent said inclined surface when said members are longitudinally separated to limit the separation therebetween and prevent said seal member from extruding therefrom.

2. A sealing arrangement comprising: a first member having a groove formed therein, said groove having a lateral wall terminating with a pointed edge, a second member mating with said first member and having an inclined surface adjacent said groove, a seal member disposed in said groove, means connecting the first member to the second member so as to compress the seal member by said lateral wall to substantially fill said groove and to sealingly engage said inclined surface, said pointed edge of said wall being the only portion of said first member engaging said inclined surface in the normal relation of said members so as to provide a line contact therebetween, and said wall being disposed closely adjacent said inclined surface when said members are longitudinally separated to limit the separation therebetween and prevent said seal member from extruding therefrom.

3. A sealing arrangement comprising: a first member having a groove formed therein, said groove having a lateral wall terminating with a pointed edge, a second member mating with said first member and having an inclined surface adjacent said groove, a seal member disposed in said groove, cooperating means formed on the first and second member to cause said seal member to be compressed by said lateral wall to substantially fill said groove and to sealingly engage said inclined surface, said pointed edge of said wall being the only portion of said first member engaging said inclined surface intermediate the ends thereof in the normal relation of said members so as to provide a line contact therebetween, and said wall being disposed closely adjacent said inclined surface when said members are longitudinally separated to limit the separation therebetween and prevent said seal member from extruding therefrom.

4. A sealing arrangement comprising: a first member having a groove formed therein, said groove having a lateral wall terminating with a pointed edge, a second member mating with said first member and having an inclined surface adjacent said groove, a seal member disposed in said groove, cooperating threads formed on the first and second member so that upon rotation of one of the members the seal is compressed by said lateral wall to substantially fill said groove and to sealingly engage said inclined surface, said pointed edge of said wall being the only portion of said first member engaging said inclined surface intermediate the ends thereof in the normal relation of said members so as to provide a line contact therebetween, and said wall being disposed closely adjacent said inclined surface when said members are longitudinally separated to limit the separation therebetween and prevent said seal member from extruding therefrom.

5. A sealing arrangement for a tubular body having a cover, said cover having an annular wall portion inserted in one end of said body, a groove formed in said wall portion and having a radially extending first annular surface terminating with a pointed edge, a second annular surface formed on said body adjacent said groove, said second surface inclined toward said first surface, a resilient seal member disposed in said groove and being compressed by said first surface to substantially fill said groove and to sealingly engage said second surface, said pointed edge of said first surface engaging said second surface in the normal relation of said surfaces so as to provide an annular line contact between said body and said cover, and said first surface being disposed closely adjacent said second surface when said body and cover are longitudinally separated to limit the gap therebetween and prevent said seal member from extruding therefrom.

6. A sealing arrangement for a tubular body having a cover, said cover having an annular wall portion inserted in one end of said body, a groove formed in said wall portion and having a radially extending first annular surface terminating with a pointed edge, a second annular surface formed on said body adjacent said groove, said second surface inclined toward said first surface and lying in a right circular cone having its apex along the longitudinal axis of the body, a resilient seal member disposed in said groove and being compressed by said first surface to substantially fill said groove and to sealingly engage said second surface, said pointed edge of said first surface engaging said second surface in the normal relation of said surfaces so as to provide an annular line contact between said body and said cover, and said first surface being disposed closely adjacent said second surface when said body and cover are longitudinally separated to limit the gap therebetween and prevent said seal member from extruding therefrom.

7. A sealing arrangement for a tubular body having a cover, said cover having an annular wall portion inserted in one end of said body, a groove formed in said wall portion and having a radially extending first annular surface lying in a plane perpendicular to the longitudinal axis of the body, said first surface terminating with a pointed edge, a second annular surface formed on said body adjacent said groove, said second surface inclined toward said first surface and lying in a right circular cone, a resilient seal member disposed in said groove, cooperating means formed on said body and cover to cause said seal member to be compressed by said first surface to substantially fill said groove and to sealingly engage said second surface, said pointed edge of said first surface engaging said second surface intermediate the ends of the latter in the normal relation of said surfaces so as to provide an annular line contact between said body and said cover, and said first surface being disposed closely adjacent said second surface when said body and cover are longitudinally separated to limit the gap therebetween and prevent said seal member from extruding therefrom.

8. A sealing arrangement for a tubular body and a cover therefor, said cover having an annular wall portion projecting therefrom, said body having an inner wall, cooperating threads formed on said cover wall portion and on said body inner wall adjacent one end of the latter, a groove formed in said cover wall portion adjacent said threads and having a radially extending first annular surface lying in a plane perpendicular to the longitudinal axis of the body, said first surface terminating with a pointed edge, a second annular surface formed on said inner wall adjacent said groove and said threads, said second surface inclined toward said first surface and lying in a right circular cone having its apex along said longitudinal axis, a resilient seal member disposed in said groove and being compressed by said first surface to substantially fill said groove and to sealingly engage said second surface, said pointed edge of said first surface engaging said second surface intermediate the ends of the latter in the normal relation of said surfaces so as to provide an annular line contact between said body and said cover, and said first surface being disposed closely adjacent said second surface when said body and cover are longitudinally separated to limit the gap therebetween and prevent said seal member from extruding therefrom.

9. A sealing arrangement for a tubular housing and a disk-type cover therefor, said cover having a cap portion terminating with a peripheral surface, a portion of said cover having threads formed thereon, a seal-retaining groove located in said cover between the cap portion and the threads on said cover, said groove being defined by a laterally extending surface connecting to a base wall, the juncture of said peripheral surface and said laterally extending surface defining a pointed edge, a tapering wall leading from said base wall to the threads formed on said cover, one end of said housing terminating with a flat surface and having the inner wall thereof formed with threads for accommodating said threaded portion on said cover, said flat surface on the terminal end of said housing connected to the threaded portion of the latter by an inclined wall, said inclined wall being so located that a plane passing therethrough makes an angle in the range between 10° and 30° with the longitudinal axis of the housing, a yieldable sealing member disposed in said groove, said cover adapted upon being threaded into said housing to have the laterally extending surface compress said sealing member and cause said pointed edge of said cap portion to engage and have a metal to metal line contact with said inclined wall substantially intermediate the ends of the latter so that longitudinal separation of said cover from said housing limits the gap therebetween and prevents said sealing member from extruding.

References Cited by the Examiner
UNITED STATES PATENTS

| | | | |
|---|---|---|---|
| 2,960,353 | 11/60 | Woodling | 285—212 X |
| 2,995,057 | 8/61 | Nenzell | 277—180 X |
| 3,070,254 | 12/62 | Carse et al. | 220—46 X |

LEWIS J. LENNY, *Primary Examiner.*

SAMUEL ROTHBERG, EDWARD V. BENHAM,
*Examiners.*